(12) United States Patent
Ericksen et al.

(10) Patent No.: US 6,337,635 B1
(45) Date of Patent: Jan. 8, 2002

(54) REMOTELY CONTROLLABLE PROGRAMMABLE HOSE FAUCET VALVE SYSTEM

(75) Inventors: Kent C. Ericksen, Centerville; Alan J. Smith, Bountiful; Kim Y. Hayes, Salt Lake City; Mike R. Ericksen, Farmington, all of UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 0 days.

(21) Appl. No.: 09/017,113

(22) Filed: Jan. 31, 1998

(51) Int. Cl.[7] .................. G08C 19/00; F16K 31/02; F17D 3/00
(52) U.S. Cl. .................. 340/825.69; 340/825.72; 251/129.04; 239/67; 137/624.11; 137/624.12
(58) Field of Search .................. 340/825.69, 825.72; 251/129.04, 129.03, 288; 239/67–70; 137/562, 624.11, 624.12

(56) References Cited

U.S. PATENT DOCUMENTS

| | | | |
|---|---|---|---|
| 3,574,336 A | | 4/1971 | Epple .................. 239/101 |
| 3,653,595 A | | 4/1972 | Greengard, Jr. et al. ...... 239/70 |
| 3,726,477 A | * | 4/1973 | Shapiro .................. 239/70 |
| 4,014,359 A | | 3/1977 | Sanner .................. 137/78 |
| RE31,204 E | | 4/1983 | Sanner .................. 137/78.3 |
| 4,592,505 A | | 6/1986 | Bruninga et al. .......... 239/69 |
| 4,722,478 A | | 2/1988 | Fletcher et al. .......... 239/69 |
| 4,838,310 A | * | 6/1989 | Scott et al. ............ 137/624.14 |
| 4,858,827 A | * | 8/1989 | Fletcher et al. .......... 239/69 |
| 4,962,522 A | | 10/1990 | Marian .................. 379/5 |
| 5,208,855 A | | 5/1993 | Marian .................. 380/9 |
| 5,427,350 A | * | 6/1995 | Rinkewich ............... 251/30.01 |
| 5,465,904 A | | 11/1995 | Vaello .................. 239/69 |
| D392,619 S | | 3/1998 | Ericksen ................ D13/168 |
| 5,813,655 A | * | 9/1998 | Pinchott et al. ........ 251/129.04 |

OTHER PUBLICATIONS

Professional Orbit Irrigation Products 1997 month unknown.
WaterMaster by Orbit "Taking Innovation To New Heights" 1998, no month.

* cited by examiner

Primary Examiner—William A. Cuchlinski, Jr.
Assistant Examiner—Yonel Beaulieu
(74) Attorney, Agent, or Firm—Mallinckrodt & Mallinckrodt; Robert R. Mallinckrodt

(57) ABSTRACT

The activation and deactivation of an outdoors, hose faucet-mounted valve unit to control the flow of water through a standard garden hose with attached sprinkler is remotely controlled from indoors rather than at the valve unit. This is accomplished without the use of unwieldy and unsightly electrical cables by means of radio frequency (RF) signals. A remote, programmable, controller unit located indoors with attached transmitting unit commands such transmitting unit to send signals in accordance with preprogrammed instructions in the controller unit. A receiver unit attached to the valve unit intercepts the transmitted signals and instructs the valve unit to open or close the water valve and flow of water based thereon. Direct connection of the controller to the valve unit is possible such that the transmitter unit and receiver unit are not used such as during pleasant weather conditions. A hand held transmitter unit can be used in place of the separate controller and transmitter to automatically control the valve unit for specific watering durations.

5 Claims, 5 Drawing Sheets

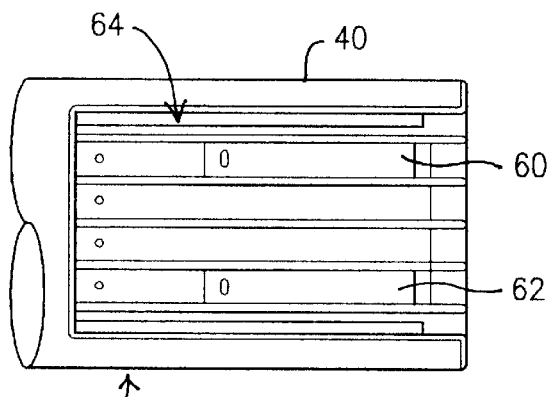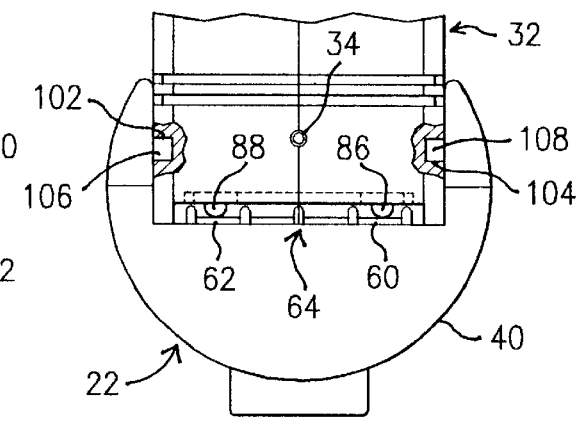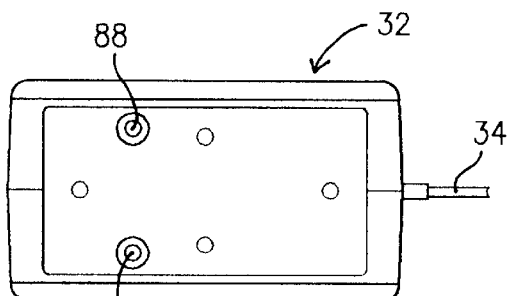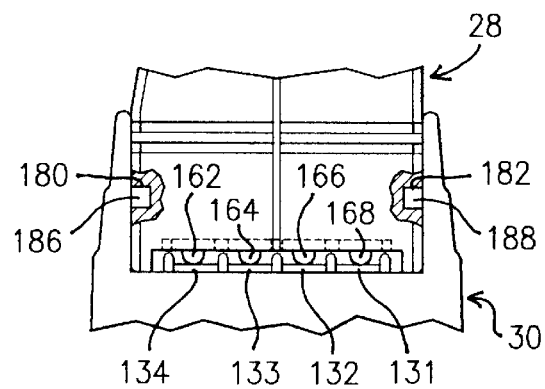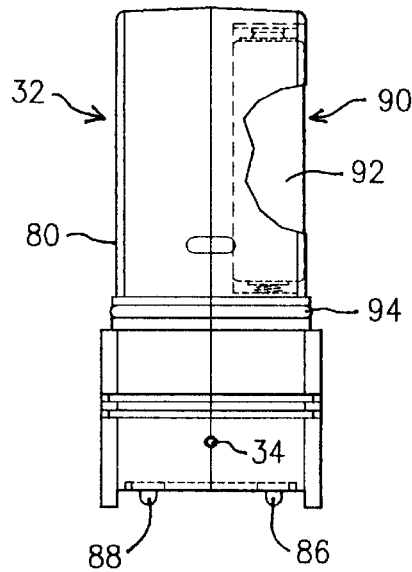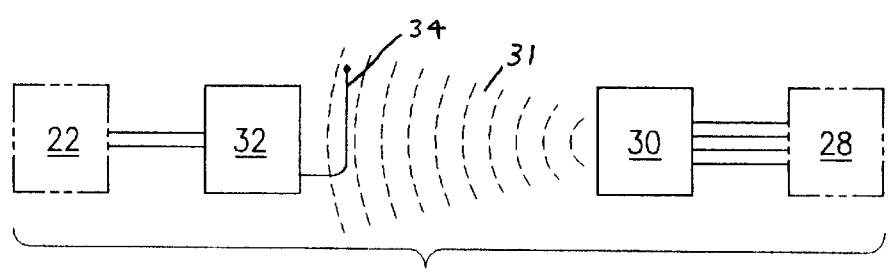

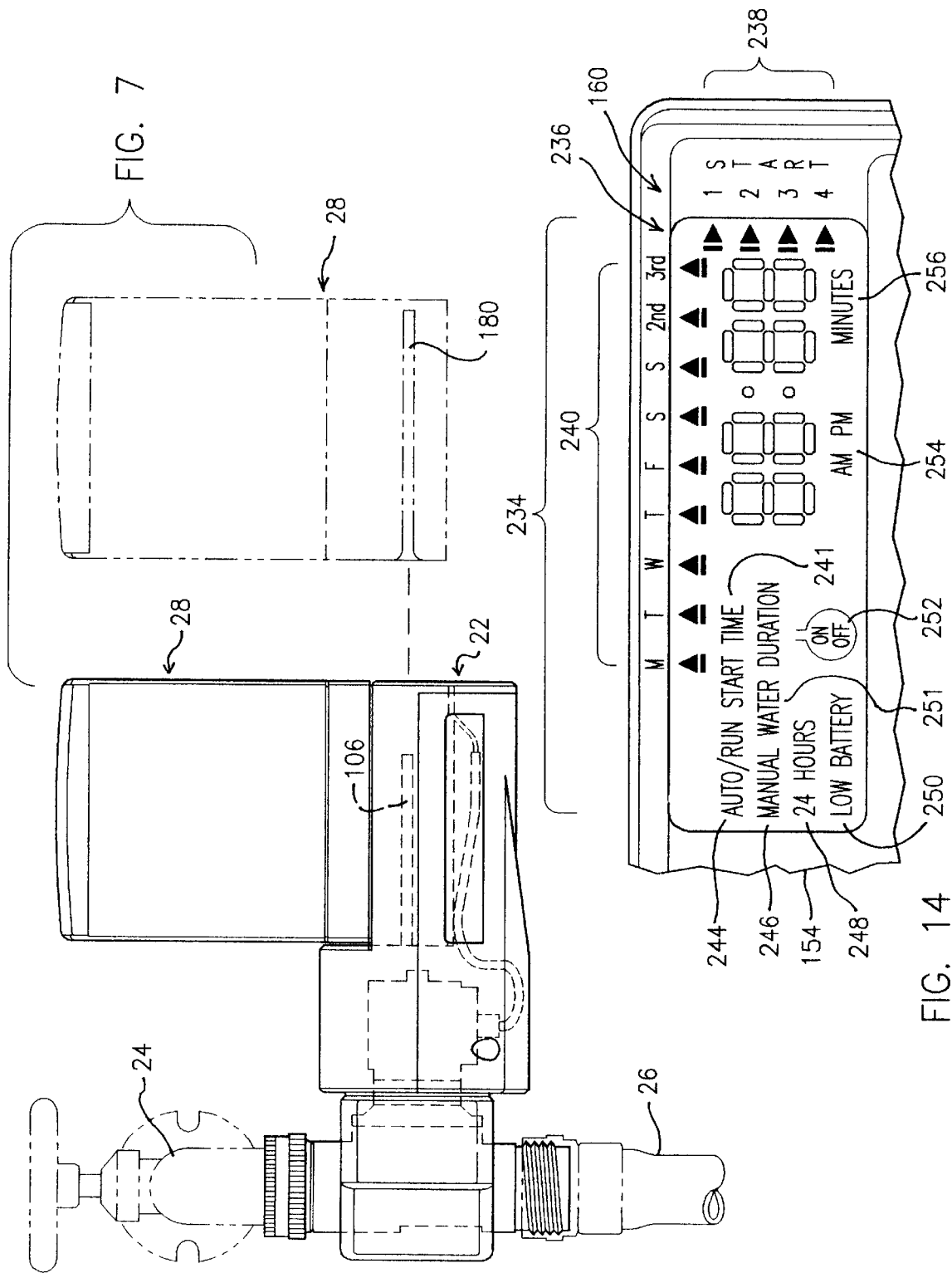

Figure 1:
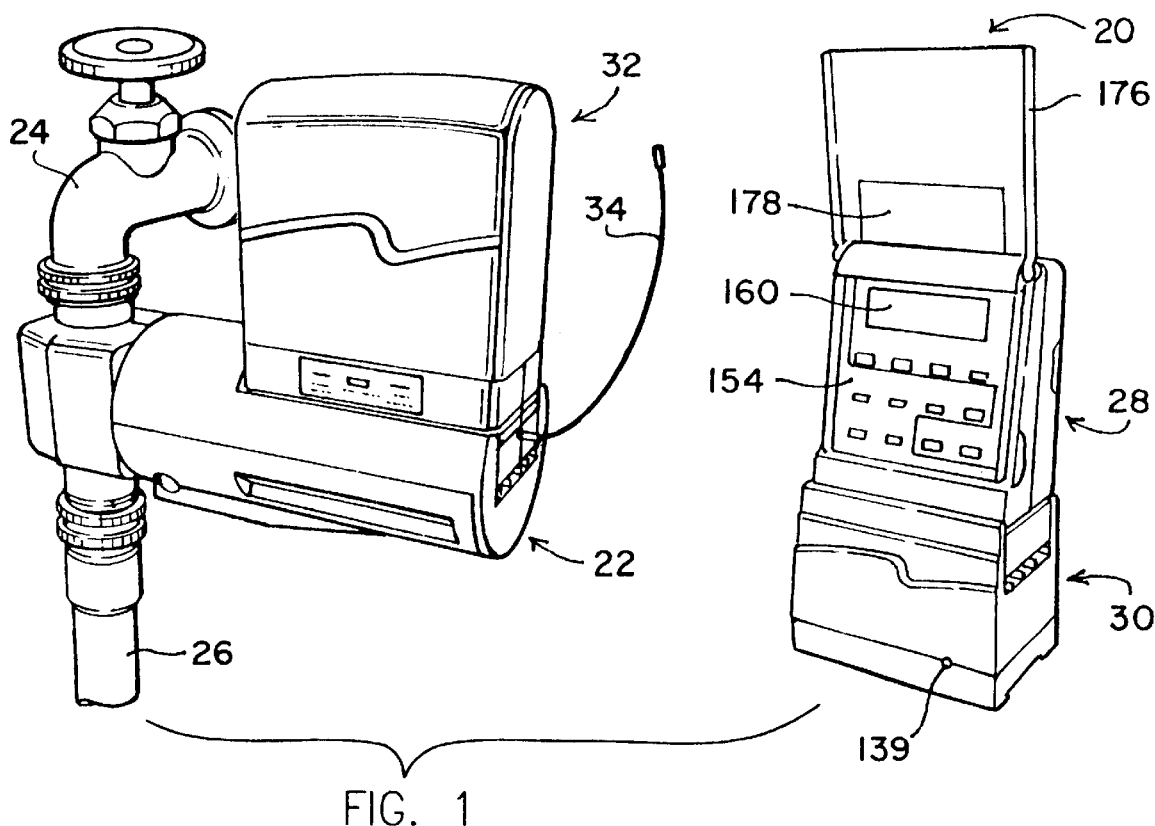

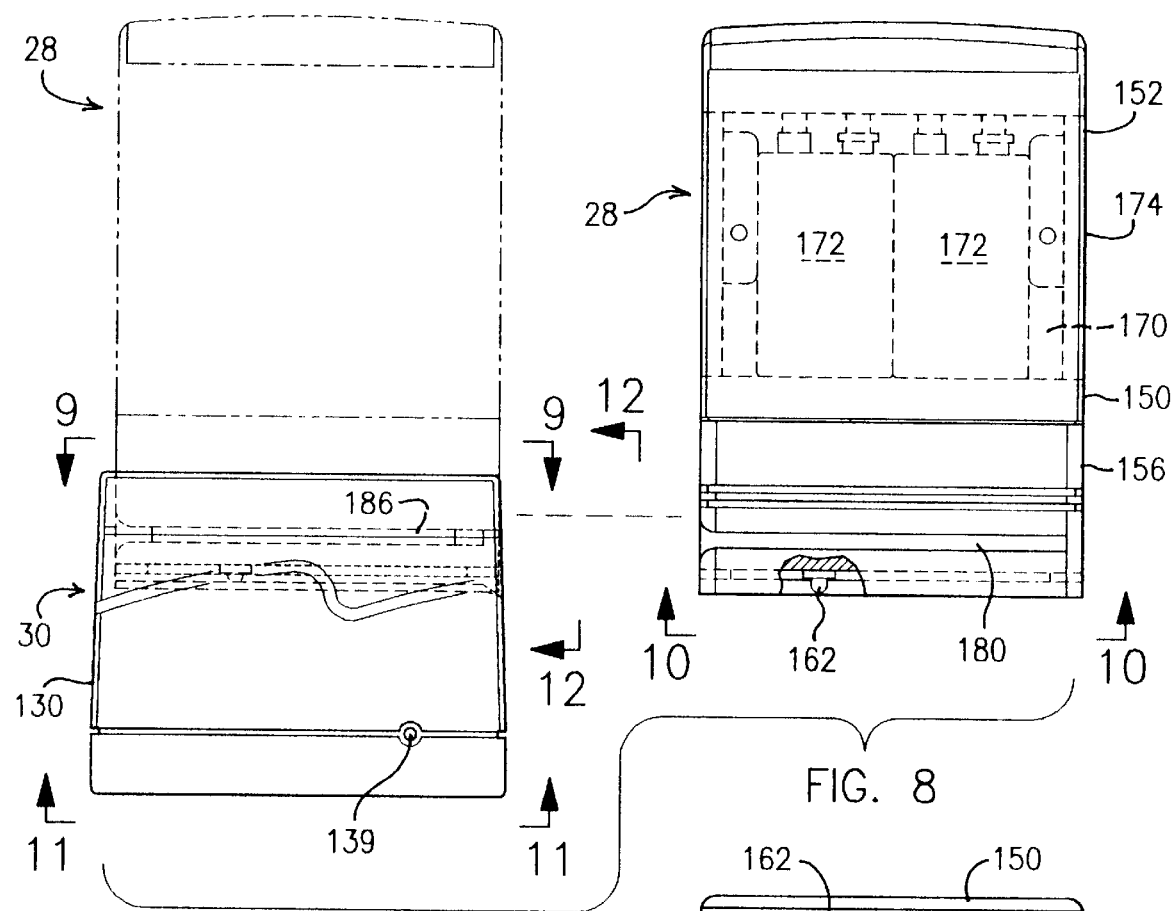
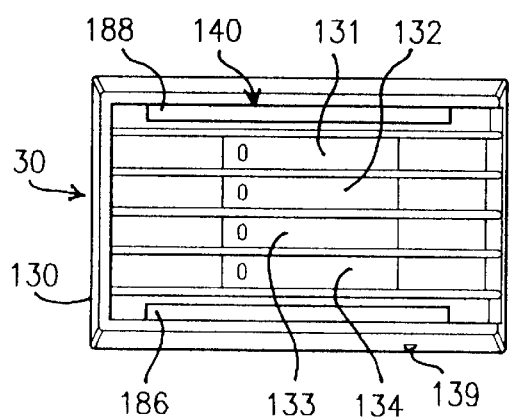
FIG. 9
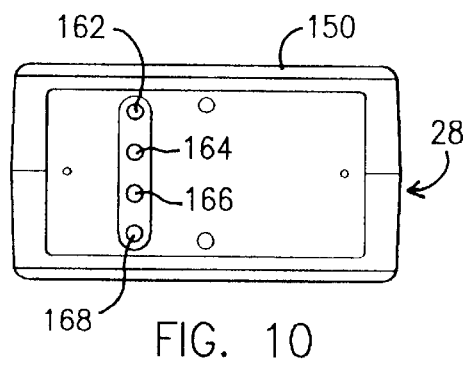
FIG. 10
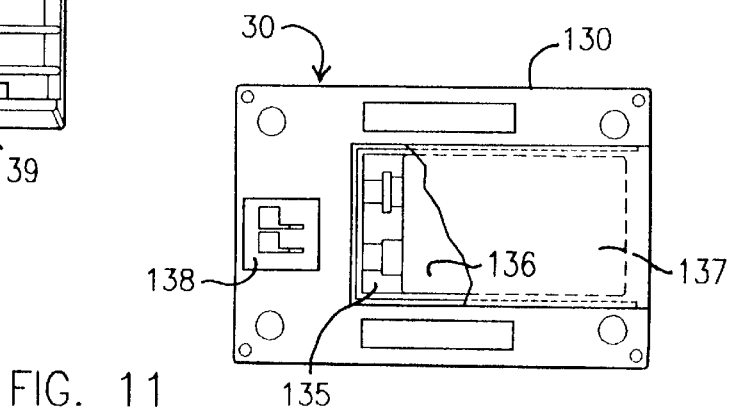
FIG. 11

REMOTELY CONTROLLABLE PROGRAMMABLE HOSE FAUCET VALVE SYSTEM

BACKGROUND OF THE INVENTION

1. Field

The invention is in the field of controller or timer systems with solenoid actuated water valve units which attach to an outdoor hose faucet and to a hose wherein the controller or timer automatically starts and stops the flow of water through the valve unit to a sprinkler or other watering device which may be attached to the hose based on preprogrammed instructions in the controller.

2. State of the Art

Above ground lawn sprinklers are commonly used by home owners to water lawns, trees, and shrubs. In a typical installation a flexible rubber hose having a female thread coupling is attached to an outdoor hose faucet, sometimes referred to as a hose bib, the other end thereof having a male thread coupling which may be attached to a lawn sprinkler or other device. In order to apply water to the lawn, trees, or shrubs, the hose faucet valve must be opened so as to allow water to flow through the hose out through the sprinkler. A common problem is forgetting to turn off the water when an adequate amount has been applied resulting in applying too much water, which costs money and which may kill that which is being watered. In an effort to alleviate this type of problem automatic hose faucet timer systems or controller systems were developed having a valve unit which connects between the hose faucet and the female end of the hose and which has a built-in electric solenoid and a diaphragm or other type of water valve. In such a system the hose faucet valve remains open and the water flow is controlled by the controller unit which operates the solenoid to open and close the water valve per preprogrammed instructions. Such controller systems are also used for micro-irrigation, drip watering from the hose without an attached sprinkler, patio misting to cool the ambient air with the hose is attached to a mist unit, animal watering with the hose attached to a watering trough or other container, and underground watering with the hose attached to an underground sprinkling pipe system.

A hose faucet controller system of the type described is the ORBIT Model #62001 Hose Faucet Timer manufactured by ORBIT Irrigation Products, Inc. of North Salt Lake, Utah. The valve unit of the controller system has an elongate horizontal body with a pivoting end which attaches between the hose faucet and the hose and with a removable control unit removably connected to the body thereof. The valve unit contains a water valve actuated by a standard electric solenoid or by a two-position low current drawing latching solenoid which draws electrical current when switching from one position to the other to open or close the water valve but which draws no electrical current once latched in either position. The controller, slidably mounted to the valve unit, is programmable and contains batteries which operate the solenoid, the electrical circuitry in the controller, and a non-volatile or other type of memory. The batteries allow the controller to be removed from the valve unit and held in the hand for programming. After programming, the controller is reassembled to the body with electrical contacts therebetween allowing electrical current from the controller batteries to pass to and actuate the solenoid.

A concern with the prior art hose faucet controller systems is that the controller unit may be subjected to rain, as well as hot and cold temperatures. While some protection can be afforded to the controller unit such as by using a cover which may have a resilient gasket to seal areas where water seepage can enter to short out the electrical circuitry therein, this is not foolproof. Also, the micro-controller and memory chips typically used in the electrical circuitry of the controller unit are still subjected to temperature extremes which may tend to shorten the service life thereof.

Another concern with the prior art hose faucet controller systems is that a person must go outside in inclement weather, such as when it is raining wherein watering is not necessary, to get the controller unit to change the program such so as to cease watering. While the controller unit can be brought indoors for reprogramming, it must be returned outdoors on the valve body to continue the programmed sequence. These concerns led to the development of a wire remote control systems in which the controller unit may be located indoors and a separate wire remote unit with an attached connection cable takes the place of the controller unit on the valve unit. Here, the controller unit is placed on a remote base unit, which includes an electrical connection to attach a separate power supply for connection to a standard wall outlet and which supplies the electrical current to run both the controller unit and the valve unit through the electrical cable. Programming changes can be made from indoors without the necessity of going outdoors to a controller unit on the valve unit for programming and subsequently returning to it to continue the program. Such a system is the ORBIT Model #62003 Wire Remote Adapter again manufactured by ORBIT Irrigation Products, Inc. of North Salt Lake, Utah.

While the wire remote controller system allows the controller unit to be placed inside the house or other shelter away from inclement weather so as to extend its service life, this as previously explained necessitates the running of a cable between the valve unit outside of the house to the controller unit inside the house. The cable may be seen as unsightly, create a tripping hazard, and may require holes to be drilled in the walls of the house for the cable routing. There is therefore a need for an improved, remotely controllable programmable hose faucet valve system to eliminate these concerns with the prior art.

SUMMARY OF THE INVENTION

According to the invention, a remotely controllable programmable hose faucet valve system includes a valve unit for attachment to a standard type outdoor hose faucet, or bib and to which can be attached a garden hose to control the flow of water such as to a sprinkler attached to the hose. A remote programmable controller unit communicates preprogrammed commands to the valve unit by means of radio frequency (RF) signals, thereby eliminating the need for cable attachment therebetween. The RF signals are sent by a transmitter unit, which also acts as a base for the controller unit and which broadcasts RF signals in response to commands from the controller unit. An RF signal receiver unit connected to the valve unit receives the RF signals and instructs the valve unit when to start and stop water flow. This allows a user to turn the water on, off, and change the timing of the waterings remotely without cables using the controller unit from inside the house rather than requiring the user to travel outside to the hose faucet. Each different transmitter unit sends an individual code in the RF signal and the receiver unit will not respond thereto unless programmed to recognize the code of that particular transmitter unit. This feature helps avoid inadvertent cross-signaling by adjacent users with the same systems. The controller unit can also be directly attached to the valve unit so that it is not necessary to use the transmitter and receiver units.

The controller unit normally comprises a housing containing the electrical circuitry including a microprocessor and one or more memory chips, along with one or more batteries to power the same, which electrical circuitry allows programming of instructions including variations in watering duration and times. A control panel thereof includes a liquid crystal display (LCD) or other type display and multiple membrane or other type programming switches, or keys which provide interaction between the user and the controller. A pivoting door advantageously covers the display, control panel, and programming keys for use of the controller unit outdoors. The door has a resilient pad attached to the inside thereof to cover and seal the display from moisture.

The transmitter unit comprises a housing containing transmitter electrical circuitry and one or more batteries to power the transmitter unit. The lower portion of the controller unit desirably has a laterally extending groove on each side thereof and has a plurality of electrically conductive spring pins extending from the bottom thereof. The controller unit slides into a recess in the transmitter unit which has inwardly directed, laterally extending tabs and upwardly facing electrical contact plates therein to mechanically and electrically interconnect the controller unit to the transmitter unit when the units are mated together, the transmitter unit also acting as a base therefor. A separate transformer may be connected to the transmitter unit to power the transmitter unit and/or the controller unit.

The valve unit comprises a body having inlet and outlet connections for attachment to a hose faucet and to a standard garden hose. A diaphragm or other type water valve is interposed between the inlet and outlet connections and is operatively connected to an electric solenoid such as a latching type solenoid which valve controls the water flow based on the instructions sent by the controller unit.

The receiver unit comprises a housing which contains receiver electrical circuitry and one or more batteries to power the receiver unit. The electrical circuitry desirably includes a standard type capacitive circuit which stores enough electrical energy within capacitors therein to assure that the solenoid will close the water valve once opened even if no battery power remains. The lower portion of the receiver unit desirably has laterally extending groove on each side thereof and has a plurality of electrically conductive spring pins extending from the bottom thereof. The receiver unit slides into a recess in the valve unit which has inwardly directed, laterally extending tabs and upwardly facing electrical contact plates therein to mechanically and electrically interconnect the receiver unit to the valve unit when the units are mated together.

The receiver unit electrical circuitry may be augmented by using a microprocessor and/or one or more memory chips therein so as to act as a controller unit itself which times the duration of watering and shuts off the water flow from the valve unit at the proper time has elapsed. In such a situation a hand held transmitter unit having a plurality of switches thereon and which transmits a code in the RF signal which the receiver unit must recognize to respond to may be used in place of the controller unit and transmitter unit. Upon depressing a particular switch the hand held transmitter unit transmits an RF signal, including a code which the augmented receiver must recognize to respond to the signal, to turn on for a period of time or to turn off the water flow from the valve unit depending on the switch depressed. If the code is recognized, the augmented receiver unit starts the water flow for the period of time signaled or stops the water flow, the receiver unit times the watering and shuts off the water flow at the proper time. Alternatively, the hand held transmitter unit can be augmented with a microprocessor and/or one or more memory chips for use with the standard, non-augmented receiver unit. In this case, the hand held transmitter unit times the watering duration and sends both the RF signal to start watering and an RF signal when it is time to cease watering. As a further alternative, a combination of an augmented receiver unit and a hand held transmitter unit may be used to further vary the functions each. Hand held transmitters such as those described are the ORBIT Models #57555 and #57556 Remote Control Transmitters Manufactured by ORBIT Irrigation Products, Inc. of North Salt Lake, Utah.

THE DRAWINGS

Figure 13:
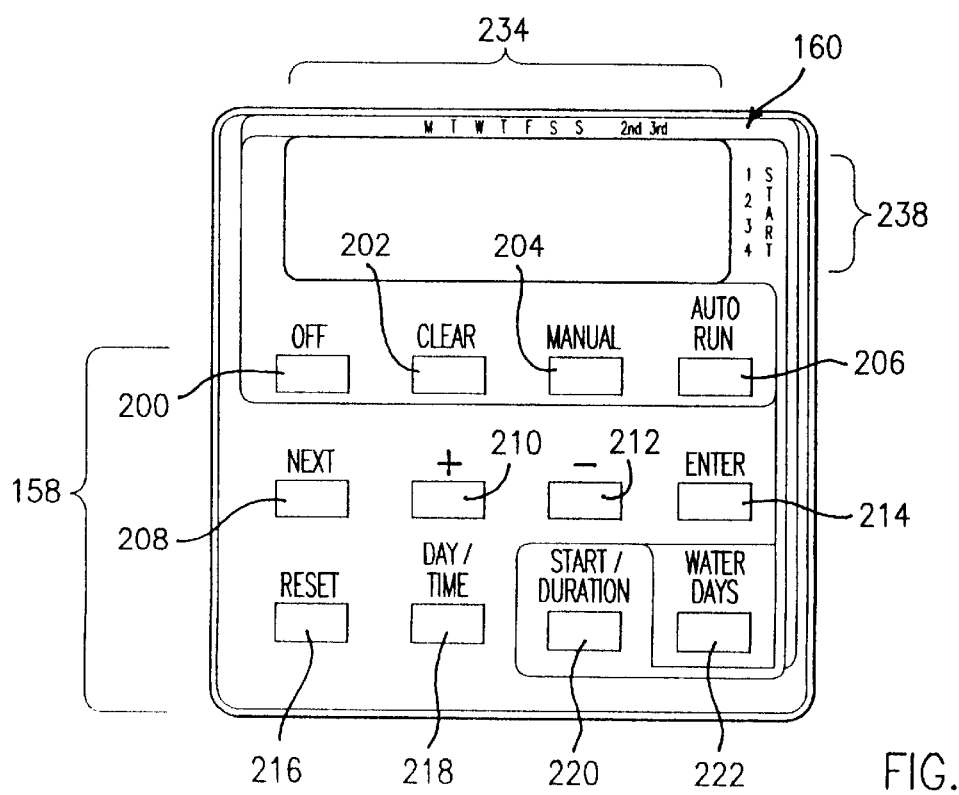
Figure 2:
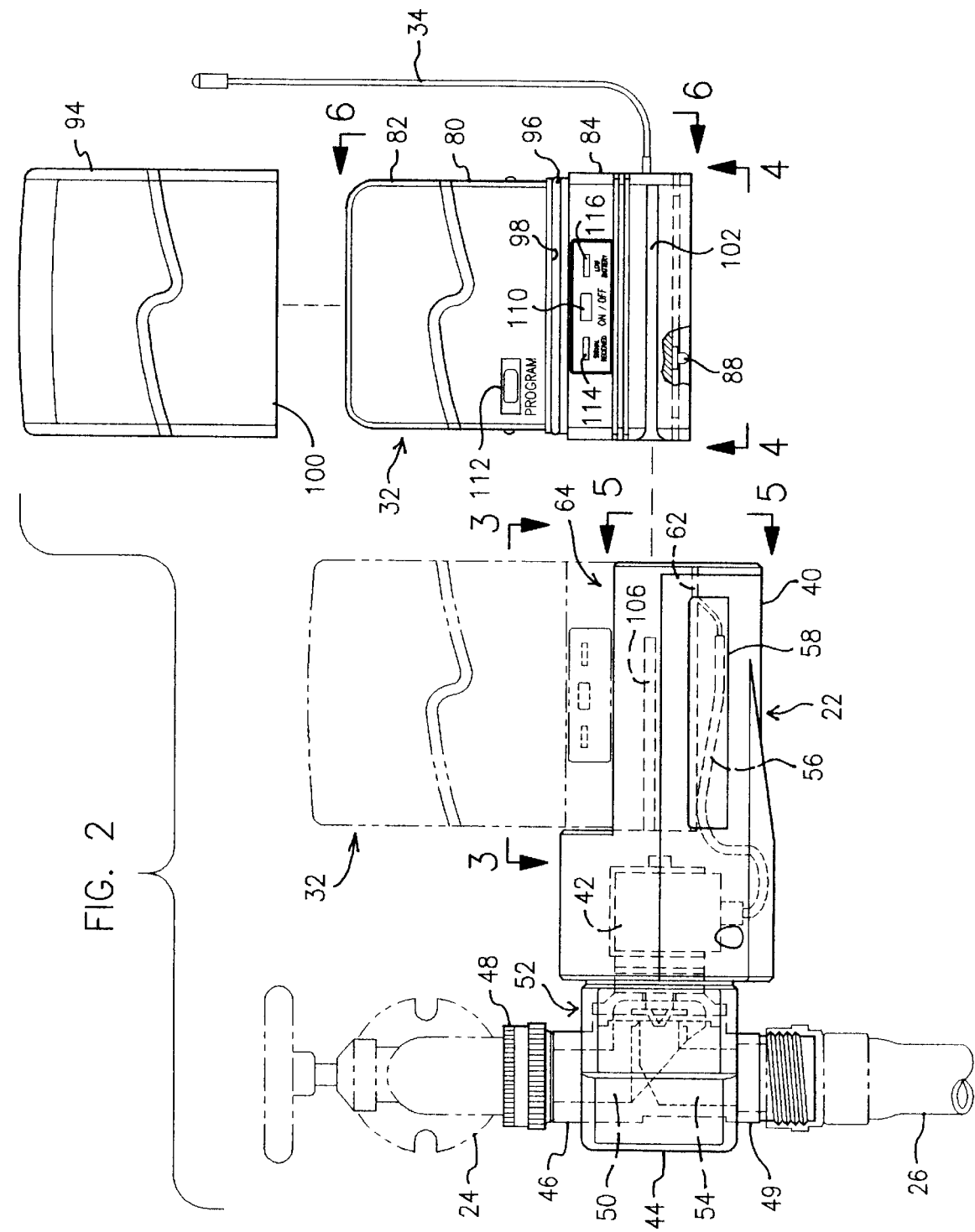

The best mode presently contemplated for carrying out the invention is illustrated in the accompanying drawings, in which:

FIG. 1 is a perspective view of the complete remotely controllable programmable hose faucet valve system of the invention;

FIG. 2, a front elevational view of the valve unit with attached receiver unit with the valve unit attached to a hose faucet;

FIG. 3, a fragmentary view in lateral horizontal section taken on the line 3—3 of FIG. 2 showing the locking tabs and electrical contact plates of the valve unit;

FIG. 4, a bottom plan view of the receiver unit taken on the line 4—4 of FIG. 2 showing the electrical spring-loaded pins of the receiver unit;

FIG. 5, a fragmentary view in longitudinal vertical section taken on the line 5—5 of FIG. 2 showing the sliding locking tab in groove fitting and electrical connections of the receiver unit to the valve unit;

FIG. 6, a side elevational view in longitudinal vertical section taken on the line 6—6 of FIG. 2 showing the receiver unit with a portion of the receiver unit main housing broken away to show the battery in the battery compartment;

FIG. 7, a front elevational view of the valve unit with the controller unit attached thereto with the valve unit attached a hose faucet;

FIG. 8, a front elevational view of the controller unit and the transmitter unit;

FIG. 9, a view in lateral horizontal section taken on the line 9—9 of FIG. 8 showing the locking tabs and electrical connection plates of the transmitter unit;

FIG. 10, a bottom plan view of the controller unit taken on the line 4—4 of FIG. 8 showing the electrical spring-loaded pins of the controller unit;

FIG. 11, a bottom plan view of the transmitter unit taken on the line 11—11 of FIG. 8 showing the electrical clips for the input wires of an electrical transformer to attach and the sliding battery compartment door with a portion thereof broken away to show the battery in the battery compartment;

FIG. 12, a fragmentary view in longitudinal vertical section taken on the line 12—12 of FIG. 8 showing the sliding locking tab in groove fitting and electrical connections of the controller unit to the transmitter unit;

FIG. 13, a front elevational view of the controller unit control panel.

FIG. 14, an enlarged fragmentary view of the display and indicators;

FIG. 15, a block diagram showing the relationships between the controller unit, transmitter unit, receiver unit, and the valve unit.

DETAILED DESCRIPTION OF THE ILLUSTRATED EMBODIMENTS

The remotely controllable programmable hose faucet valve system of the invention is shown in FIG. 1 and a block diagram thereof is shown in FIG. 15. The timer system 20 comprises a valve unit 22 which attaches between a hose faucet 24 and to a hose 26 which may be connected to a lawn sprinkler, a programmable controller unit 28, a transmitter unit 30 which transmits an RF signal 31 based on commands from the controller unit 28, and a receiver unit 32 which intercepts the RF signal via antennae 34 and which actuates valve unit 22.

As best illustrated in FIG. 2, valve unit 22 comprises a main housing 40 inside of which is an electric latching type solenoid 42 which draws no electrical current when latched in each of two operating positions. Pivotally attached to main housing 40 is a pivoting housing 44 inside of which is disposed a piping piece 46 having at one end a swiveling internally threaded hose faucet connector 48 which connects to the hose faucet 24 and at the opposite end a fixed externally threaded hose connector 49 which connects to hose 26. Pivoting housing 44 allows main housing 40 to rotate relative thereto to aid a user in seeing and programming controller unit 28 while attached thereto. An inlet passage 50 in piping piece 46 directs water from hose faucet 24 to a diaphragm type water valve 52 and an outlet passage 54 in piping piece 46 directs water away from water valve 52 into hose 26. Water valve 52 is operatively connected to solenoid 42 so as to open or close as solenoid 42 moves between its two positions and back based on signals conducted thereto from controller unit 28 through insulated electrical wires 56 and 58, through electrical contact plates 60 and 62, respectively (FIGS. 3 and 5). Hose faucet 24 is maintained in an open valve position during use such that pressurized water is continually available at inlet passage 50 to water valve 52 such that the flow of water into hose 26 is controlled solely by water valve 52. Valve unit main housing 40 has a recessed area 64 for slidably accepting receiver unit 32 (FIGS. 3 and 5).

Still referring to FIG. 2, receiver unit 32 comprises a main housing 80 having an upper portion 82 and a lower portion 84. Main housing 80 houses standard type RF signal receiver electrical circuitry (not shown) which pick up RF signals via antennae 34 which signals are processed and an electrical signal sent when appropriate to a pair of electrical spring-loaded pins 86 and 88 (FIGS. 4 and 6). Within main housing upper portion 82 is a battery compartment 90 (FIG. 6) which houses four batteries 92 which power the receiver electrical circuitry and which provide electrical current to contacts 86 and 88 to power solenoid 42. An upper housing 94 slides over main housing upper portion 82 to retain batteries 92 in battery compartment 90 and to seal receiver unit 32 including batteries 92 and the electrical circuits therein against moisture. The sealing is accomplished by means of an O-ring 96 which is disposed in a circumferential groove 98 in main housing 80. When upper housing 94 is positioned over main housing upper portion 82 the inside of bottom portion 100 of upper housing 94 bears against O-ring 94 to seal against moisture entry between the respective housings. Sealing of various spaces and holes such as where antenna 34 exits receiver unit 32 may be done using liquid silicone or other type sealer. The use of such sealer may also be done to seal valve unit 22 if necessary. Receiver unit main housing lower portion 84 mates with valve unit main housing 40 by means of a pair of grooves 102 and 104 which slidably engage a pair of opposing locking tabs 106 and 108 in recess 64 of valve unit main housing 40 (FIG. 5). In such position, receiver unit electrical spring-loaded pins 86 and 88 engage contact plates 60 and 62, respectively, to conduct electrical current from receiver unit 32 to valve unit 22. Receiver unit 32 is manually operated by means of an ON/OFF switch 110 which allows manual control of solenoid 42. PROGRAM switch 112 is used to program receiver unit 32 to respond to the RF signals from a particular transmitter unit 30 or other transmitter unit such as a hand held transmitter (not shown). SIGNAL RECEIVED LED 114 indicates when illuminated that a signal has been received from transmitter unit 30 by blinking three times showing that receiver unit 32 is now programmed to respond thereto. If receiver 32 is already in the process of executing the command SIGNAL RECEIVED LED blinks once. LOW BATTERY LED 116 illuminates when the water valve is turned on manually using ON/OFF switch 110 of receiver unit 32 or when an RF signal is received remotely from transmitter unit 30 which illumination indicates that batteries 92 (FIG. 6) need replacement. Alternatively, LOW BATTERY LED 116 may intermittently illuminate or blink to indicate that batteries 92 need replacement.

Referring to FIG. 8, the transmitter unit 30 comprises a housing 130 which acts as a base for controller unit 28 when attached thereto. Inside of transmitter unit 30 are transmitter electrical circuitry (not shown) which transmit RF signals based on commands received from controller unit 28 conducted via electrical contact plates 131, 132, 133, and 134 (FIGS. 9 and 12). Housing 130 has a battery compartment 135 (FIG. 11) houses a battery 136 which powers transmitter unit 30. A battery compartment sliding door 137 secures battery 136 within battery compartment 135. A dual quick release electrical clip 138 allows connection of wires (not shown) from a separate electrical AC transformer (not shown) to power transmitter unit 30 and/or controller unit 28 so as to not rely on battery power. Housing 130 has a recessed area 140 for slidably accepting controller 28 (FIGS. 9 and 12). A transmit and low battery indicator LED 139 illuminates when transmitter unit 30 is transmitting RF signals and when it does not illuminate when transmitting indicates that batteries 92 of controller unit 28 (FIG. 6) and/or battery 136 of transmitter unit 30 (FIG. 11) needs replacement. Alternatively low battery indicator LED 139 may intermittently illuminate or blink to indicate battery 136 needs replacement.

Still referring to FIG. 8, controller unit 28 comprises a housing 150 having an upper portion 152 to which a control panel 154 (FIG. 1) is attached and a lower portion 156. Housing 150 houses the electrical circuitry which may include a microprocessor and memory chips (not shown) which circuitry receives programming commands which are input through a plurality of membrane or other type sealed switches or keys 158 (FIG. 13) on control panel 154, which commands are displayed on a liquid crystal display (LCD) 160 along with showing the particular mode of operation controller unit is in, and which sends an electrical signal when needed to the appropriate electrical spring-loaded pins 162, 164, 166, and 168 (FIGS. 10 and 12). Within housing upper portion 152 is a battery compartment 170 which houses two batteries 172 which power the controller unit electrical circuitry and which provide electrical current to contacts 162, 164, 166, and 168 to cause transmitter unit 30 to send an RF signal to receiver unit 32. A battery compartment door 174 attaches to upper housing 152 to retain batteries 172 in battery compartment 170. A main door 176 (FIG. 1) is pivotally mounted to controller unit upper portion 152 and may be closed over control panel 154 as protection against moisture such as if used outdoors. A resilient sealing gasket 178 may be adhesively or otherwise affixed to the interior surface of main door 176 to cover display 160 when main door 176 is closed and further protect display 160 from moisture and dirt. Controller unit housing lower portion 156 mates with transmitter unit housing 130 by means of a pair of grooves 180 and 182 which slidably engage a pair of opposing locking tabs 186 and 188 in recess 140 of transmitter unit housing 130 (FIG. 12). In such position, receiver unit electrical spring-loaded contacts 162, 164, 166, and 168 engage contact plates 134, 133, 132, and 131, respectively, to conduct electrical commands from controller unit 28 to transmitter unit 30. Likewise, controller housing lower portion 156 also can mate directly with valve unit main housing 40 (FIG. 7) by means of grooves 180 and 182 which slidably engage locking tabs 106 and 108 in recess 64 of valve unit main housing 40 (FIG. 5).

In FIG. 13 is shown control panel 154 having a plurality of sealed keys 158 and having graphic printing 159 on the face thereof to assist in the programming thereof. An OFF key 200 turns controller unit 28 off, a CLEAR key 202 clears the last entry made, a MANUAL key 204 allows manual setting and running of the watering, an AUTO/RUN key 206 causes the preprogrammed watering schedule to be run, a NEXT key 208 changes LCD display 160 to the next item to be programmed, a "+" key 210 increases the displayed watering parameter, a "−" 212 key decreases the displayed watering parameter, an ENTER key 214 enters the data displayed into controller unit 28, a RESET key 216 erases prior programming to allow entry of new programming, a DAY/TIME key 218 switches the displayed data to be entered from day of watering to time of watering, a START/DURATION key 220 switches the displayed data to be entered from starting time to watering duration, and a WATER DAYS key 222 sets which days watering will occur.

In FIG. 14 is shown display 160 which has a plurality of indicators 234 thereon which display at various stages in the programming of controller unit 28. A four digit, seven segment per digit time/water duration display 236 variously indicates clock, start time, and watering duration, a set of four START indicators 238 showing the four start times selected, a set of nine watering days indicators 240 showing days of the week and every second or third day, a START TIME indicator 241 shows starting time is being shown on display 236, an AUTO/RUN indicator 244 shows the controller unit 28 is in the Auto/Run mode of operation, a MANUAL indicator 246 shows controller unit 28 is in the Manual Watering mode of operation, a 24 HOURS indicator 248 shows watering is off for twenty-four hours, a LOW BATTERY indicator 250, which may alternately blink shows that batteries 172 (FIG. 8) need to be replaced, a WATER DURATION indicator 251 indicates water duration is active, a water droplet shaped ON/OFF indicator 252 shows if the watering is ON or OFF, an AM/PM indicator 254 shows A.M. or P.M. for the clock and start times, and a MINUTES indicator 256 shows watering duration in minutes.

Controller unit 28 is operated by using keys 158 on control panel 154 in conjunction with LCD display 160 which indicates what mode of operation controller unit 28 is in and what information has been entered. The current day of the week and time are set using RESET key 216 to erase previously stored information, DAY/TIME key 218 to show a blinking curser of indicator 240 under the M for Monday of graphic printing 159, NEXT key 208 to move the curser of indicator 240 to beneath the correct day of the week, then using ENTER key 214 to store the current day of the week. A default time of day then blinks on display 236 and AM shows on indicator 254. "+" key 210 and/or "−" key 212 are used to change the time of day on display 236 and on AM/PM indicator 254 followed by using the ENTER key 214 to store the current time of day.

The watering start time and duration of the watering are set using START/DURATION key 220 which causes START TIME indicator 241 and water droplet shaped ON/OFF indicator 252 to appear along with blinking bars (not shown) on display 236 and a blinking curser adjacent the "1" of START on printed graphics 159 to appear. Using "+" key 210 and/or "−" key 212 display 236 is changed to the desired starting time. Using ENTER key 214 stores the desired starting time and causes WATER DURATION indicator 251 and MINUTES indicator 256 to appear along with blinking bars (not shown) to appear on display 236. Using "+" key 210 and/or "−" key 212 display 236 can be changed to the desired watering duration of up to six hours, after which the water is automatically shut off, and using ENTER key 214 stores the desired watering duration. This is repeated for up to three additional starting times.

The active watering days are set using WATER DAYS key 222 which causes a blinking curser on indicator 240 to appear below the M for Monday of printed graphics 159. The curser is moved using NEXT key 208 and the active watering days chosen using ENTER key 214 which causes a solid triangle of indicator 240 to appear thereunder. Alternatively, watering every second or third day can be chosen in the same manner with a solid triangle of indicator 240 likewise appearing thereunder.

Automatic watering is selected by using AUTO RUN key 206 which causes AUTO RUN 244 indicator to appear, the current time with a blinking colon to appear on display 236, AM/PM indicator 254 showing AM or PM for the current time, and a solid triangle to appear under the current day of the week on indicator 240.

Manual watering is selected when currently in the Auto Run mode by using MANUAL key 204 which causes MANUAL indicator 246 to appear and display 236 to blink. "+" key 210 and/or "−" key 212 are used to change the minutes on display 236 to the desired watering duration of up to six hours and using the ENTER key 214 enters the watering duration. Water shaped droplet ON/OFF indicator 252 with ON therein appears along with display 236 alternately showing the current time of day and watering duration, AM/PM indicator 254 to show the current time of AM or PM, and a solid triangle of days indicator 240 to show under the current day of the week on printed graphic 159. The manual watering mode is discontinued using CLEAR key 202 which switches to the automatic mode of operation.

Automatic watering is inhibited for twenty-four hours when in the automatic mode using CLEAR key 202 and which causes water droplet ON/OFF indicator 252 to appear with OFF shown therein and 24 HOURS indicator 248 to appear. The current day continues to be shown by a solid triangle under the day of printed graphic 159, and the current time shown on display 236 and AM/PM indicator 254. The inhibit mode is cancelled using AUTO RUN key 206 which causes 24 HOURS indicator 248 and water shaped droplet ON/OFF indicator 252 to disappear.

The controller unit 28 is shut down with programming commands retained in memory using OFF key 200. Water droplet shaped ON/OFF indicator 252 appears with OFF shown therein. The current day continues to be shown by a solid triangle under the day of printed graphic 159, with the current time shown on display 236 and AM/PM indicator 254. Using RESET key 216 causes all existing programming to be erased.

The receiver unit 32 is programmed by placing it proximate controller unit 28 with transmitter unit 30 connected thereto. Using PROGRAM switch 112 on receiver unit 32 causes SIGNAL RECEIVED LED 114 to illuminate for thirty seconds. A manual start time is then entered into controller unit 28 using MANUAL key 204 and using "+" key 210 until a "1" appears on display 236 and then using ENTER key 214 which causes transmit and low battery indicator LED 139 on transmitter unit 30 to illuminate and SIGNAL RECEIVED LED 114 on receiver unit 32 to blink several times indicating the RF signal was received. If transmit and low battery indicator LED 139 does not illuminate when a command is transmitted then the batteries 172 in controller unit (FIG. 8) and/or battery 136 in transmitter unit 30 (FIG. 11) need replacement. If LOW BATTERY LED 116 on receiver unit 32 illuminates when receiver unit 32 is manually operated or when a signal is received from transmitter unit 30, the batteries 92 (FIG. 6) therein need to be replaced. Receiver unit 32 may also be manually operated without using controller unit 28 and transmitter unit 30 to turn on and off the flow of water from valve unit 22 by using ON/OFF switch 110 on receiver unit 32. Receiver unit 32 automatically stops the flow of water after sixty minutes if not manually stopped using ON/OFF switch 110 or receiving RF signals from transmitter unit 30 prior thereto.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claims:

1. A remotely controllable programmable hose faucet valve apparatus for turning on and off the flow of water remotely from a hose faucet to which a hose connects, comprising:
   a valve unit which interposes between the hose faucet and the hose to selectively turn on and off the flow of water therethrough;
   a programmable controller unit for determining when water flow from the hose faucet should take place and when it should be stopped in accordance with instructions input into said controller unit;
   a transmitter unit interconnected with said controller unit for emitting radio frequency (RF) signals based input from said controller unit;
   a receiver unit interconnected with said valve unit which intercepts said RF signals from said transmitter unit and activates or deactivates said valve unit in accordance with said RF signals; and
   wherein said receiver unit and said valve unit mechanically slidably removably interconnect by means of a pair of opposing tabs on one unit which engage mating grooves in the other unit and wherein said units electrically interconnect by means of electrically conductive spring pins on one unit which engage complementary electrically conductive contact plates on the other unit.

2. A remotely controllable programmable hose faucet valve apparatus for turning on and off the flow of water remotely from a hose faucet to which a hose connects, comprising:
   a valve unit which interposes between the hose faucet and the hose to selectively turn on and off the flow of water therethrough;
   a programmable controller unit for determining when water flow from the hose faucet should take place and when it should be stopped in accordance with instructions input into said controller unit;
   a transmitter unit interconnected with said controller unit for emitting radio frequency (RF) signals based input from said controller unit;
   a receiver unit interconnected with said valve unit which intercepts said RF signals from said transmitter unit and activates or deactivates said valve unit in accordance with said RF signals; and
   wherein said controller unit and said transmitter unit mechanically slidably removably interconnect such that said transmitter unit acts as a base for said controller unit, by means of a pair of opposing tabs on one unit which engage mating grooves in the other unit and wherein the units electrically interconnect by means of electrically conductive spring pins on one unit which engage complementary electrically conductive contact plates on the other unit.

3. A remotely controllable programmable hose faucet valve apparatus for turning on and off the flow of water remotely from a hose faucet to which a hose connects, comprising:
   a valve unit which interposes between the hose faucet and the hose to selectively turn on and off the flow of water therethrough;
   a programmable controller unit for determining when water flow from the hose faucet should take place and when it should be stopped in accordance with instructions input into said controller unit;
   a transmitter unit interconnected with said controller unit for emitting radio frequency (RF) signals based input from said controller unit;
   a receiver unit interconnected with said valve unit which intercepts said RF signals from said transmitter unit and activates or deactivates said valve unit in accordance with said RF signals;
   wherein each of said receiver and said controller units mechanically slidably interconnect to each of said valve unit and said transmitter unit by means of a pair of opposing tabs on one unit which engage mating grooves in the other unit and wherein said units electrically interconnect by means of electrically conductive spring pins on one unit which engage complementary electrically conductive contact plates on the other unit; and
   wherein said controller unit and said transmitter unit removably interconnect, said receiver unit and said valve unit removably interconnect, and wherein said controller unit removably interconnects with said valve unit such that said controller unit directly controls said valve unit.

4. In an apparatus for turning on and off the flow of water from a hose faucet to which a hose connects of the type having a valve unit which interposes between the hose faucet and the hose to selectively turn on and off the flow of water therethrough and a programmable controller unit which removably connects thereto for determining when water flow from the hose faucet should take place and when it should be stopped in accordance with instructions input into said controller unit, the improvement comprising:

a transmitter unit which interconnects with the controller unit for emitting radio frequency (RF) signals based on input from the controller unit;

a receiver unit which interconnects with the valve unit and which intercepts said RF signals from said transmitter unit to activate and deactivate said valve unit in accordance with said RF signals; and wherein each of said receiver unit and the controller unit mechanically slidably interconnect to each of the valve unit and said transmitter unit by means of a pair of opposing tabs on one unit which engage mating grooves in the other unit and wherein the units electrically interconnect by means of electrically conductive spring pins on one unit which engage complementary electrically conductive contact plates on the other unit.

5. An apparatus improvement according to claim 4 wherein the transmitting unit acts as a base for the controller unit.

* * * * *